United States Patent [19]

Bunn

[11] 4,280,800

[45] Jul. 28, 1981

[54] CONCRETE SLAB SURFACE FINISHING APPARATUS

[75] Inventor: Christopher B. Bunn, North Vancouver, Canada

[73] Assignee: Dyform Engineering Limited, Vancouver, Canada

[21] Appl. No.: 74,842

[22] Filed: Sep. 13, 1979

[30] Foreign Application Priority Data

Oct. 28, 1977 [CA] Canada .................................. 289831

[51] Int. Cl.[3] .......................... B28B 1/26; B28B 7/04; B29C 1/00

[52] U.S. Cl. ...................................... 425/62; 404/103; 404/105; 425/64

[58] Field of Search .................................... 425/62-64; 404/93, 105, 106, 103, 112, 117, 123, 125, 126, 129, 132; 264/333, 33, 34

[56] References Cited

U.S. PATENT DOCUMENTS

| | | | |
|---|---|---|---|
| 1,994,082 | 3/1935 | Abernathy | 404/106 |
| 2,048,071 | 7/1936 | Jacobson | 404/75 |
| 3,143,781 | 8/1964 | Kalns | 425/432 |
| 3,200,177 | 8/1965 | Dodd | 264/70 |
| 3,208,362 | 9/1965 | Sigmund | 404/98 |
| 3,224,065 | 12/1965 | Cheskin | 425/65 |
| 3,600,773 | 8/1971 | Davis | 425/63 |
| 3,608,011 | 9/1971 | Jones | 264/70 |

*Primary Examiner*—W. E. Hoag
*Attorney, Agent, or Firm*—Townsend and Townsend

[57] ABSTRACT

A support frame to span and to be moved over the surface of a concrete slab on wheels running on rails extending along side edges of the slap, and having a hopper for depositing a layer of finishing material on the slab surface ahead of at least one roller carried by the frame, said finishing material being confined on the surface by side walls depending from the frame and overlapping the side edges of the slab. Power means rotates the roller, and this roller can be adjusted vertically relative to the frame to adjust the thickness of finishing material being rolled onto the slab surface.

17 Claims, 9 Drawing Figures

Fig. 7.
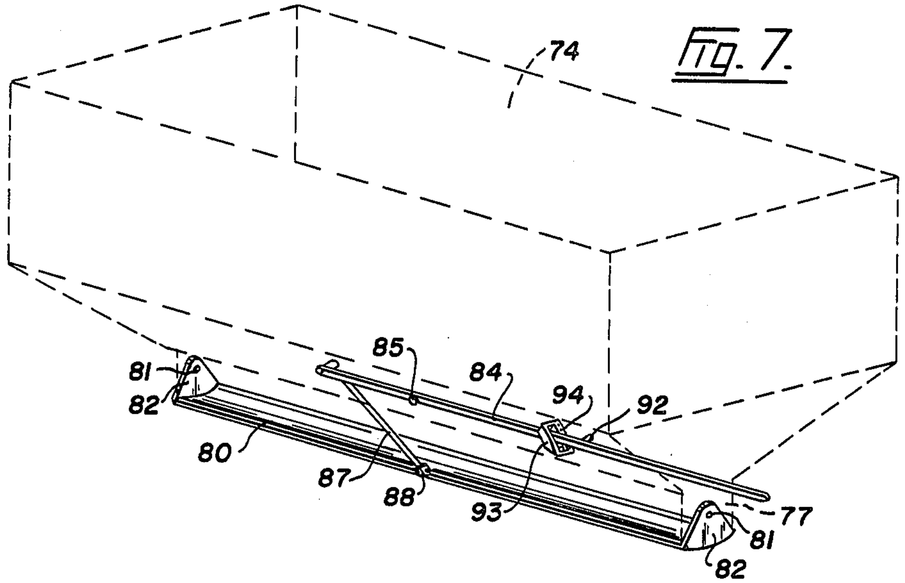
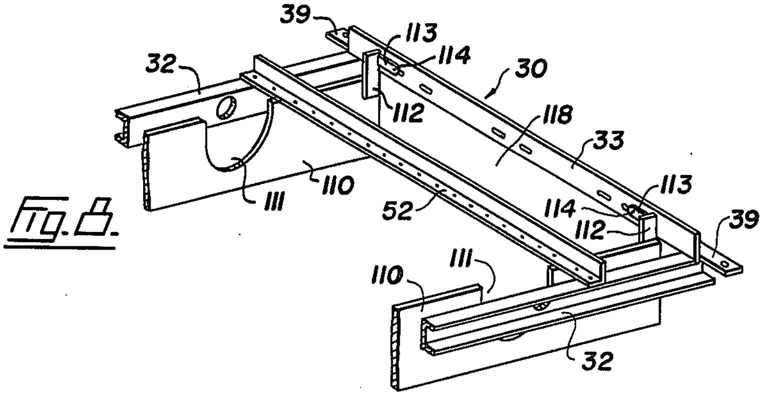
Fig. 8.
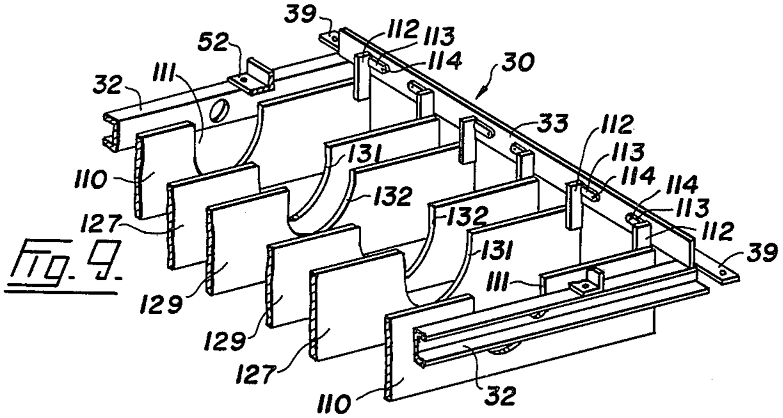
Fig. 9.

CONCRETE SLAB SURFACE FINISHING APPARATUS

FIELD OF THE INVENTION

This invention relates to apparatus for applying finishing coats to concrete slabs preferably immediately after the slabs have been formed.

Although any concrete slab, beam or flat construction can be finished by the apparatus of this invention, it is primarily designed for slabs intended to be used as floor, wall or roof slabs in buildings. These slabs are extruded by apparatus of the type illustrated in Canadian Pat. No. 910,030 dated Sept. 19. 1972. Although the extruded slabs usually have a smooth and even surface, these surfaces are often not smooth enough to enable a cover, such as flooring material or paint, to be directly applied to the surfaces thereof. Prior to this invention, when concrete slabs were produced, the upper surfaces of these were either left without any further attention, or they were manually trowelled or finished in order to produce flat surfaces that a covering, such as synthetic tiles, could be directly applied thereto.

SUMMARY OF THE INVENTION

The apparatus of the present invention deposits a layer of finishing material, such as a sand-cement mixture of concrete, to the surface of the slab and trowels this material over the surface as the apparatus moves along the slab. The apparatus can be self propelled, or it can be attached to the concrete extruder which forms the slab to move therewith as the slab is created. The apparatus includes at least one roller for rolling out the finishing material on the slab surface, and the height of this roller above the surface can be adjusted to regulate the thickness of the finishing material being applied and to ensure that the finishing material covers any protuberances on the slab surface.

When the slab is produced by apparatus similar to that of patent 910,030, said apparatus moves along tracks on opposite sides of a bed on which the slab or beam is produced. The present finishing apparatus has wheels so that it travels along the same rails. The finishing material is deposited by a hopper onto the slab surface ahead of a roller which is perferably driven in the direction opposite to the direction of movement of the finishing apparatus. The finishing material is confined on the slab surface by side walls depending from the finishing apparatus to overlap the side edges of the slab.

Apparatus in accordance with this invention for finishing the concrete slab comprises a support frame to span and to be moved over the surface of a concrete slab to be finished, confining side walls depending from the frame to overlap side edges of the slab, at least one roller carried by the frame and extending transversely thereof, power means connected to the roller to rotate said roller, and hopper means carried by the frame and positioned to deposit a layer of finishing material on the slab surface ahead of the roller with reference to the direction of movement of the support frame, said roller rolling out the finishing material on the slab surface, and said side walls confining the finishing material on said surface.

BRIEF DESCRIPTION OF THE DRAWINGS

A preferred form of slab surface finishing apparatus is illustrated in the accompanying drawings, in which:

FIG. 7 illustrates the hopper gate and the mechanism for operating this gate, FIG. 8 is a perspective view of an end of a sub frame of the apparatus, and FIG. 9 is a view similar to FIG. 8, but showing an alternative sub frame arrangement.

DESCRIPTION OF THE PREFERRED EMBODIMENTS

Figure 1:
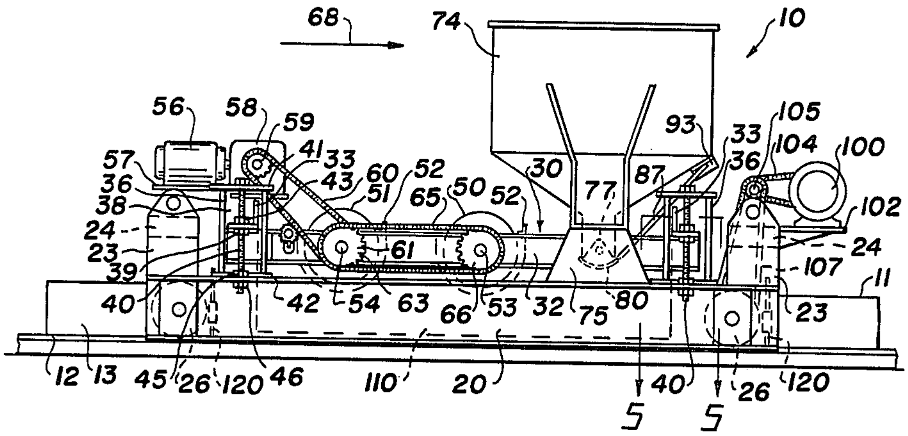
FIG. 1 is a side elevation of the surface finishing apparatus.

Referring to FIGS. 1 to 8 of the drawings, 10 is a slab surface finishing apparatus in accordance with this invention which is shown straddling a concrete slab 11 having rails 12 running along opposite side edges 13 thereof. Although these rails may be provided especially for the finishing operation, it is preferable that apparatus 10 follow a concrete slab extruding apparatus during formation of the slab, riding on rails 12 at this time.

Apparatus 10 includes a support frame 20 made up of spaced-apart side members 22 having uprights 23 at their opposite ends which are interconnected by cross members 24, said cross members being spaced above the side members by uprights 23. Wheels 26 are journalled on inner surfaces of side members 22 adjacent opposite ends thereof. These wheels ride on rails 12, and the side members are low enough to overlap the sides 13 of the slab, said side members being spaced outwardly from said slab.

An inner or sub frame 30 is mounted on support frame 20 for vertical adjustment relative thereto. This sub frame consists of side members 32 interconnected by cross members 33 at there opposite ends. Sub frame 30 is mounted within the bounds of support frame 20 but is spaced above the latter, as shown in FIG. 1.

Sub frame 30 is mounted for vertical adjustment relative to support frame 20 in any desired manner. In this example, a vertical support 36 is mounted on each side member 22 of the support frame near and spaced inwardly from each end of said side member. As the sub frame 30 is supported at the four corners thereof in the same manner, only one corner will now be described in detail.

Each vertical support 36 has a large vertical slot 38 therein into which a lug 39 projects from an adjacent corner of the sub frame. A relatively long threaded bolt 40 extends through and downwardly from a top plate 41 of support 36, freely through lug 39 of the sub frame and through a flange 42 on the side member 22 of frame 20. The lug 39 is retained in any selected position on bolt 40 by upper and lower nuts 43 and 44 threaded on the bolt while the latter is adjustably connected to flange 42 by upper and lower nuts 45 and 46.

One or more transverse rollers are carried by sub frame 30, and in this example, there are two rollers 50 and 51. There is a scraper 52 carried by the sub frame adjacent and bearing against each of these roller. These rollers have shafts 53 and 54 journalled in suitable bearings in side members 32 of the sub frame, and these rollers are driven in any convenient manner. For example, an electric motor 56 is mounted on a plate 57 carried by one of the cross members 33 of the sub frame. This motor is connected through a speed controller unit 58 to a sprocket 59 which is connected by a chain 60 to a sprocket 61 mounted on shaft 54, and another sprocket 63 on said shaft is connected by a chain 65 to a sprocket 66 on shaft 53. If apparatus 10 is moved in the direction of arrow 68 in FIGS. 1, 2 and 3, it is preferable to rotate rollers 50 and 51 in the direction opposite to the direction of this movement, as indicated by arrow 70 in FIG. 3, although they can be rotated in the opposite direction, if desired.

A hopper 74 is carried by a vertical support 75 at each end thereof, each support arrangement being mounted on and extending upwardly from a side member 22 of support frame 20. This hopper extends across the apparatus and has a relatively thin discharge spout 77 projecting downwardly into sub frame 30 and extending across the width thereof. Hopper 74 holds the finishing material to be applied to the upper surface of slab 11. Any suitable material may be used, but preferably is a sand-cement mixture which is relatively dry.

The discharge from spout 77 is controlled in any convenient manner, such as by a gate 80 which normally overlies the lower or outer end of the spout and is swingingly mounted on pins 81 projecting from the ends of the spout and into lugs 82 connected to and projecting outwardly from the ends of the gate. Gate 80 is swung out of and back to its spout closing position by a lever 84, see FIG. 7, mounted for swinging movement on a pin 85 projecting from a portion of the hopper. A link 87 is swingably connected at one end to an inner end of lever 84 and extends downwardly therefrom to a lug 88 projecting from gate 80. When lever 84 is swung generally upwardly, gate 80 is swung away from spout 77 to open the latter, and when the lever is moved in the opposite direction, the gate is returned to its position closing the spout. The lever is retained in any adjusted position by a spring loaded pin 92 mounted thereon and projecting towards a quadrant 93 having a plurality of holes 94 therein. The outer surface of quadrant 93 is curved with its centre of curvature coinciding with pin 85.

As stated above, apparatus 10 can be pulled along rails 12 during operation by a suitable traction unit, but it is preferable to make the apparatus self propelled. In this case suitable power means is provided, such as a reversible electric motor 100 at the front end 101 of the apparatus. Motor 100 is mounted on a support 102 carried by the adjacent support 24, is connected through a speed reducer 103 and chain and sprocket drive 104 to cross shaft 105 journalled in bearings 106 mounted on the support 24. Shaft 105, in turn, is connected at its ends through sprocket and chain drives 107 to the adjacent wheels 26 therebelow.

A confining side wall 110 is swingably mounted on sub frame 30 and depends therefrom to bear against each side edge 13 of slab 11. As these side walls extend longitudinally of the apparatus, each side wall has a large notch 111 in the upper edge thereof to accommodate each of the rollers 50 and 51. The mounting of these side walls is illustrated in FIG. 8. Each wall or plate 110 has a hanger 112 projecting upwardly from each end thereof. Each of these hangers has an arm 113 at its upper end projecting substantially at right angles thereto inwardly along an adjacent cross member 33 of the sub frame. The outer or free end of each arm 113 is connected by pivot 114 to the adjacent cross member 33. With this arrangement, the mounting of the side wall 110 is out of balance so that when the wall is free, its lower edge tends to swing inwardly of the sub frame. When apparatus 10 is straddling a concrete slab, the side walls swing inwardly to bear against the sides edges 13 of the slab.

Although not absolutely necessary, it is desirable to provide a transverse confining wall 118 depending from the front cross member 33, the lower edge of this transverse wall being spaced above the lower edges of side walls 110, see FIG. 8.

It is preferable to mount a scraper 120 on support frame 20 ahead of each wheel 26. Each scraper 120 consists of a vertical blade 121 freely extending through a socket 122 secured to a side member 22 of the support frame immediately ahead of a wheel 26 thereon. The lower end of the blade rides on track 12, and a pin 123 through the upper end of the blade prevents the latter from dropping downwardly through its socket.

The apparatus described so far is set up to span a single relatively-wide concrete slab 11. The apparatus can also be used to finish the upper surfaces of a plurality of relatively narrow concrete slabs extending parallel to each other between rails 12. In this case it is necessary to provide confining side walls for each of the slabs. FIG. 9 illustrates confining walls for three slabs. The two outside confining walls 110 are present to bear against the outer side edges of the two outer slabs. A similar side wall 127 is spaced inwardly from and opposed to each outer wall 110, while another pair of opposed similar confining side walls 129 are provided between the two pairs of walls 110, 127. The confining walls 110, 127 and 129 are all mounted in the same manner, and the walls of each pair tend to swing towards each other so that they bear against the side edges of the concrete slabs located therebetween. Walls 127 have large notches 131 and walls 129 have similar notches 132 therein to accommodate the rollers 50 and 51.

In this example, the spout 77 is divided into three different laterally aligned sections which project downwardly between the three pairs of confining side walls. Gate 80 also has to be divided into three sections to correspond to the three sections of the spout projecting downwardly from the hopper.

Figure 2:
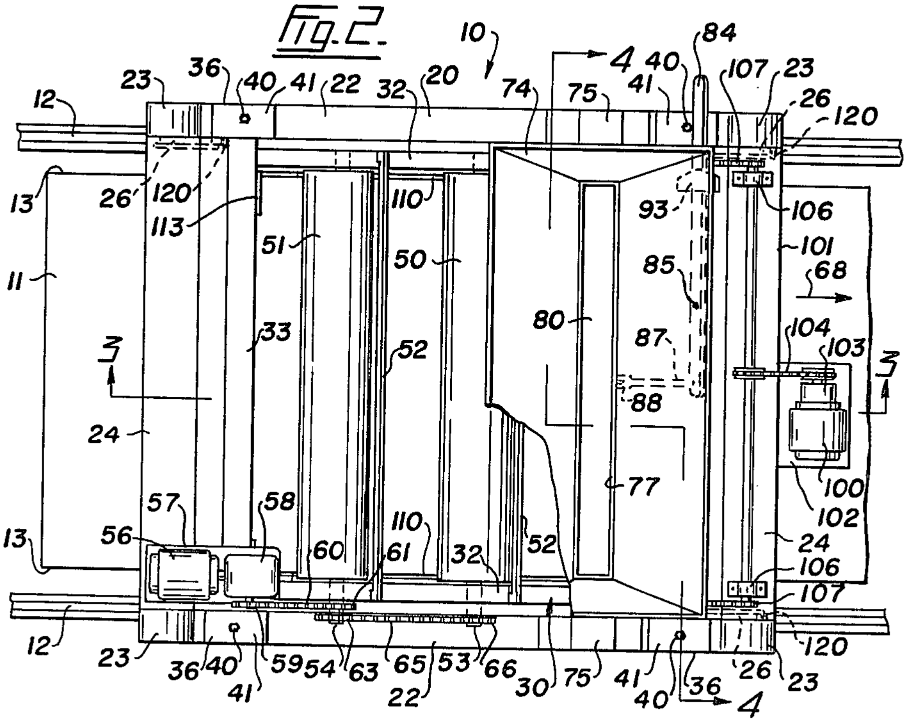
FIG. 2 is plan view of this apparatus.
Figure 3:
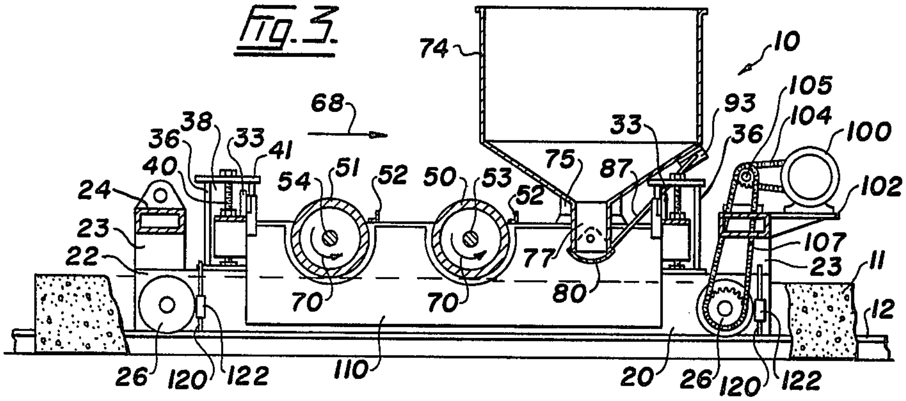
FIG. 3 is a longitudinal section taken on the line 3—3 of FIG. 2.
Figure 4:
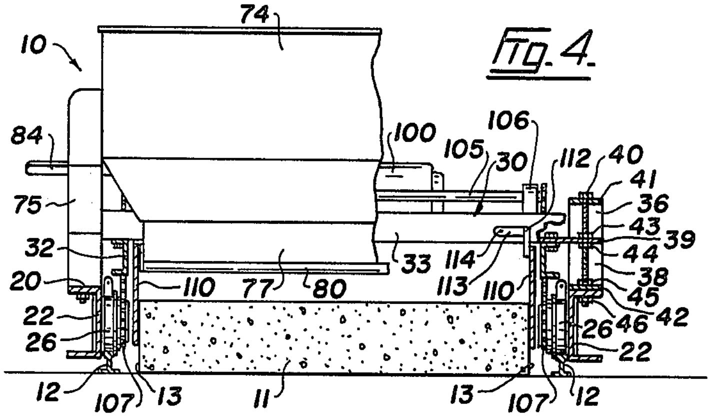
FIG. 4 is a cross section taken on the line 4—4 of FIG. 2.
Figure 5:
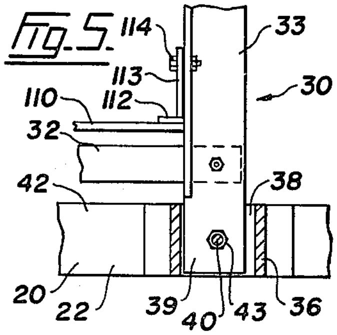
FIG. 5 is an enlarged fragmentary section on the line 5—5 of FIG. 1.
Figure 6:
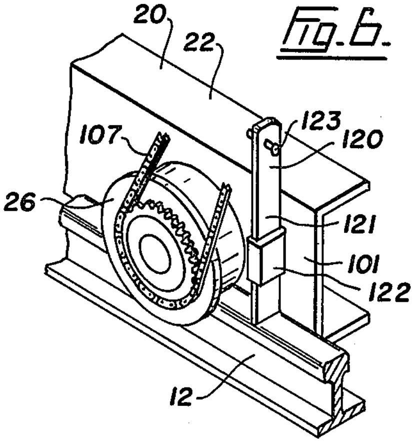
FIG. 6 is an enlarged fragmentary view of one end of the support frame of this apparatus showing a scraper positioned ahead of one of the wheels thereof.

When apparatus is ready for operation, its wheels 26 ride on rails 12 so that the apparatus spans the single concrete slab of FIGS. 1 and 2, or the three concrete slabs of the embodiment illustrated in FIG. 9. Hopper 74 contains the desired mixture of finishing material, such as a fairly dry mix of concrete, with gate 80 in the closed position. The sub frame 30 is adjusted vertically by nuts 42, 43 on bolts 40 at the four corners of the sub frame to position the surfaces of rollers 50 and 51 a desired distance above the upper surface of the slab. This also adjusts the transverse confining wall 118 relative to said slab surface.

Motors 100 and 56 are energized respectively to cause apparatus 10 to move forwardly and to rotate rolls 50 and 51 in the direction opposite to the direction of movement of the apparatus. The blades 121 of scrapers 120 scrape along rails 12 to remove any particles or dirt therefrom before the wheels reach said particles. Gate 80 is opened to a desired degree by means of lever 84 to allow the finishing material to flow down onto the upper surface of the slab just ahead of lead roller 50, and the two rollers spread the finishing material over the slab surface to the desired degree of thickness. Side walls 110 prevent the finishing material from spilling over the sides of the slab. After the slab has been covered and trowelled by the transverse rollers and after the slab has been removed or the finishing coat hardened, motor 100 is reversed to return apparatus 10 to the starting position. Alternatively, apparatus 10 can be lifted off the rails by means of a suitable crane and placed on the rails of another slab bed.

The operation is the same for the embodiment illustrated in FIG. 9, the only difference being that three slabs between the pairs of confining side walls are finished and trowelled at the same time.

As previously stated, apparatus 10 preferably follows the extruder, not shown, which forms the slab. When this is done, although the concrete of the slab is firmly compacted, it has not set and so the finishing coat readily adheres to the slab surface.

I claim:

1. Apparatus for finishing the surface of a concrete slab, comprising:

a support frame to span and to be moved over the surface of a concrete slab to be finished, confining side walls depending from the frame to overlap side edges of the slab, means swingingly suspending said side walls from the frame out of balance so that the walls tend to swing inwardly relative to the frame and against the side edges of the slab, at least one roller carried by the frame and extending transversely thereof, power means connected to the roller to rotate said roller, and hopper means carried by the frame and positioned to deposit a layer of finishing material on the slab surface ahead of the roller with reference to the direction of movement of the support frame, said roller rolling out the finishing material on the slab surface and said side walls confining the finishing material on said surface.

2. Apparatus as claimed in claim 1 comprising means for adjusting said roller vertically relative to the support frame and said surface of the slab.

3. Apparatus as claimed in claim 1 in which said power means rotates said roller in the direction opposite to the direction of movement of the frame.

4. Apparatus as claimed in claim 1 comprising:

a front wall depending from the support frame ahead of and spaced from the roller and extending transversely of the frame, and means for adjusting the front wall vertically relative to said surface of the slab.

5. Apparatus as claimed in claim 1 comprising:

a second roller carried by the frame and extending transversely thereof spaced rearwardly from said first-mentioned roller, and means connecting the second roller to said power means to be rotated thereby.

6. Apparatus as claimed in claim 1 including wheels on the support frame to carry the latter, said wheels being positioned to ride on rails extending longitudinally of said slab at the side edges thereof.

7. Apparatus as claimed in claim 6 including a scraper carried by the support frame ahead of each of said wheels to clean dirt off said rails.

8. Apparatus as claimed in claim 7 in which each scraper comprises a vertical blade extending through a socket mounted on the support frame.

9. Apparatus for finishing the surface of a concrete slab, comprising:

a support frame to span and to be moved over the surface of a concrete slab to be finished, a sub frame carried by and extending across the support frame;

means for adjusting the sub frame vertically relative to the support frame, confining side walls depending from the sub frame to overlap and bear against side edges of the slab, means swingably suspending said side walls from the sub frame out of balance so that the walls tend to swing inwardly relative to the frame and against the side edges of the slab, at least one roller carried by the sub frame and extending transversely thereof, power means connected to the roller to rotate said roller, and hopper means carried by the support frame and positioned to deposit a layer of finishing material on the slab surface ahead of the roller with reference to the direction of movement of the support frame, said roller rolling out the finishing material on the slab surface and said side walls confining the finishing material on said surface.

10. Apparatus as claimed in claim 9 in which said power means rotates said roller in the direction opposite the direction of movement of the frame.

11. Apparatus as claimed in claim 9 comprising a front confining wall depending from the sub frame ahead of and spaced from the roller and extending transversely of the sub frame.

12. Apparatus as claimed in claim 9 comprising a second roller carried by the sub frame and extending transversely thereof spaced rearwardly from said first-mentioned roller, and means connecting the second roller to said power means to be rotated thereby.

13. Apparatus as claimed in claim 9 in which both the support frame and the sub frame are rectangular in shape and said adjusting means comprises bolt means at each of four corners of said frames for adjusting said each corner of the sub frame vertically relative to said each corner of the support frame.

14. Apparatus as claimed in claim 9 in which there are a plurality of pairs of opposed confining walls depending from the sub frame to overlap side edges of a plurality of substantially parallel slabs to be finished, said support frame and said sub frame being wide enough to span said plurality of slabs.

15. Apparatus as claimed in claim 9 including wheels on the support frame to carry the latter, said wheels being positioned to ride on rails extending longitudinally of said slab at the side edges thereof.

16. Apparatus as claimed in claim 15 including a scraper carried by the sub frame ahead of each of said wheels to clean dirt off said rails.

17. Apparatus as claimed in claim 16 in which each scraper comprises a vertical blade extending through a socket mounted on the support frame.

* * * * *